United States Patent
Malkhasyan et al.

(10) Patent No.: US 9,171,162 B2
(45) Date of Patent: Oct. 27, 2015

(54) RANDOM FILE REQUEST FOR SOFTWARE ATTESTATION

(75) Inventors: Mushegh Malkhasyan, Redmond, WA (US); Gilbert Wong, Bellevue, WA (US); Paul C. Roberts, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 774 days.

(21) Appl. No.: 13/075,173

(22) Filed: Mar. 29, 2011

(65) Prior Publication Data

US 2012/0254361 A1    Oct. 4, 2012

(51) Int. Cl.
*G06F 21/57*     (2013.01)
*G06F 11/00*     (2006.01)

(52) U.S. Cl.
CPC ............... *G06F 21/57* (2013.01); *G06F 11/00* (2013.01)

(58) Field of Classification Search
CPC ................ H04L 29/08072; H04L 29/0809; H04L 29/06; G06F 17/3089; G06Q 10/10
USPC ................................................. 709/217, 218
See application file for complete search history.

(56) References Cited

U.S. PATENT DOCUMENTS

| | | | |
|---|---|---|---|
| 2002/0091924 A1* | 7/2002 | Vlcan et al. | 713/168 |
| 2002/0141577 A1 | 10/2002 | Ripley et al. | |
| 2005/0268328 A1 | 12/2005 | Corliano | |
| 2006/0177226 A1* | 8/2006 | Ellis, III | 398/116 |
| 2006/0259969 A1 | 11/2006 | Suh et al. | |
| 2008/0052348 A1* | 2/2008 | Adler et al. | 709/203 |
| 2008/0235802 A1* | 9/2008 | Venkatesan et al. | 726/26 |
| 2008/0256631 A1* | 10/2008 | Zvi | 726/22 |
| 2008/0301793 A1 | 12/2008 | Kim et al. | |
| 2009/0006259 A1* | 1/2009 | Hsi | 705/59 |
| 2009/0171878 A1* | 7/2009 | Zeng | 706/46 |
| 2010/0042688 A1* | 2/2010 | Maghraby | 709/206 |
| 2010/0064026 A1* | 3/2010 | Brown et al. | 709/217 |
| 2010/0100946 A1 | 4/2010 | Hallam-Baker | |
| 2010/0217997 A1 | 8/2010 | Chai et al. | |
| 2012/0246470 A1* | 9/2012 | Nicolson et al. | 713/158 |

OTHER PUBLICATIONS

Y. Deswarte, J. J. Quisquater, A. Saidane, Remote integrity checking, In Proc. of Conference on Integrity and Internal control in Information systems (IICIS'03), 2003.*

G. Ateniese, R. Burns, R. Curtmola, J. Herring, L. Kissner, Z. Peterson, D. Song, "Provable Data Possession at Untrusted Stores", dated 2007.*

(Continued)

*Primary Examiner* — Vivek Srivastava
*Assistant Examiner* — Hien Doan
(74) *Attorney, Agent, or Firm* — Steve Wight; Judy Yee; Micky Minhas (57) ABSTRACT

Technologies pertaining to attesting to computer-executable code residing on a robot are described herein. An attestation server includes a database that comprises file paths that correspond to files on the robot at a time of manufacture of the robot. The database also includes file digests that are indicative of content of the files on the robot. The attestation server randomly selects a file path and transmits the file path to the robot. The robot accesses the file at the file path and computes a file digest for that file. The robot then transmits the file digest to the attestation server, which compares the file digest from the robot with the file digest in the database. If the file digests match, then the attestation server attests to the computer-executable code on the robot.

20 Claims, 9 Drawing Sheets

(56) References Cited

OTHER PUBLICATIONS

Milewski, Zandr, "WEP 115 Mongolian Crypto Scheme for Firefox Sync", Retrieved at <<https://wiki.mozilla.org/Services/Sync/WEP/115>> Jun. 13, 2010, pp. 1-9.

"Nonce, a Randomly Generated Token", Retrieved at <<http://publib.boulder.ibm.com/infocenter/wasinfo/v6r1/index.jsp?topic=/com.ibm.websphere.express.doc/info/exp/ae/cwbs_noncev6.html>> Nov. 15, 2010, p. 1.

"Cryptographic nonce", Retrieved at <<http://en.wikipedia.org/wiki/Cryptographic_nonce>> Nov. 26, 2010, pp. 1-2.

* cited by examiner

FIG. 9

RANDOM FILE REQUEST FOR SOFTWARE ATTESTATION

BACKGROUND

Manufacturers of computing hardware that are designed and intended to execute a particular software stack generally desire to prohibit unauthorized software to be executed on the aforementioned hardware. In an example, manufacturers of certain mobile telephones have operating systems that desirably execute thereon to provide a user with a particular user experience that is known to be associated with a particular mobile telephone. Accordingly, an aim of the manufacturer is to prohibit someone from undermining that user experience, for instance, by removing memory from the mobile telephone and replacing it with memory that is loaded with a different operating system (an operating system that is not intended to be executed on the mobile telephone). This jail breaking of the mobile telephone detracts from the user experience and may also interfere with a business model of the manufacturer of the mobile telephone. For example, such manufacturer may wish to monetize particular content that can be executed only by the operating system that is intended to execute on the mobile telephone. If unauthorized content or software is executing on the mobile telephone, this monetization of content may be extremely difficult or impossible.

Furthermore, it is desirable to detect when a computing device has been infected with malicious code, such as a virus, spyware, or the like. Conventionally, to prevent malicious code from being placed on a computing device, a user purchases and installs anti-virus software and executes such software on the computing device, which can consume a significant amount of computing resources. While this model has worked relatively effectively in the past, today users may have multiple computing devices, each of which may be in danger of receiving malicious code. For example, a user may have a desktop computer, a laptop computer, a mobile telephone, such as a smart phone, a gaming console, a Blu-Ray disc player or other suitable computing devices that are connected to a network and may therefore become infected with malicious code. It is inefficient and costly for a user to install and maintain antivirus packages on each of these computing devices.

SUMMARY

The following is a brief summary of subject matter that is described in greater detail herein. This summary is not intended to be limiting as to the scope of the claims.

Described herein are various technologies pertaining to determining whether content on hardware of a computing device has been altered in an unauthorized manner. Pursuant to an example, a robot can be configured with computer readable storage that is accessible by a processor, wherein the computer readable storage can include instructions that cause the robot to act in certain manners when executed by the processor. The robot can be configured with an antenna that facilitates communication with a remote computing device, such as a server, by way of a network connection. At boot up of the robot, or periodically, it may be desirable to determine whether the contents (e.g., software) loaded on a certain portion of computer-readable storage in the robot has been altered in an unauthorized manner. For example, it may be desirable to ascertain whether a hard drive on the robot has been removed and replaced with another hard drive that is loaded with an operating system that is not intended to be executed on the robot. Moreover, it may be desirable to ascertain whether malicious code has caused contents of certain portions of computer hardware on the robot to be modified in an unauthorized manner.

An attestation server is described herein that can facilitate attestation of computer-executable code on the robot. In an example, the attestation server can verify that content of certain files on the robot have been unaltered since manufacture of the robot or since an authorized update of content of the robot. As will be described below, the attestation server can comprise data that is indicative of content on the hard disk and/or memory of the robot, and can compare such data with data that is provided by the robot. If it is determined that content of files of the robot have been altered in an unauthorized manner, the robot can be caused to operate in a limited functionality mode. For instance, movement of the robot may be restricted. Otherwise, the robot can continue to operate with full functionality.

Pursuant to an example, the robot can be in communication with an attestation server that is configured to analyze content of the robot and verify that content of the robot has not been altered in an unauthorized manner. For instance, the attestation server can comprise a database that includes a plurality of file paths that correspond to a plurality of files resident on the robot at a previous point in time. For instance, the previous point in time can be a time of manufacture of the robot. In another example, the previous point in time can be a most recent update of an operating system of the robot that is authorized by the manufacturer of such robot. Additionally, the attestation server can include a plurality of file digests that correspond to the plurality of files that are known to be on the robot at the previous point in time. These file digests are indicative of the content of the files resident upon the robot.

The attestation server can randomly select a file path from amongst the plurality of file paths, wherein the selected file path is a location of a file known to be resident on the robot at the previous point in time. The attestation server may then transmit this file path to the robot. The robot receives the file path and accesses the file that corresponds to such file path. The robot may then compute a file digest for the file on the robot that is located at the file path. The file digest is then transmitted back to the attestation server, which compares the received file digest with the file digest retained on the attestation server that is known to correspond to such file at the previous point in time. If the two file digests are equivalent, then the attestation server can transmit a validation message to the robot that allows the robot to continue to operate with full functionality. If, however, the file digest transmitted by the robot fails to match the file digest retained in the data repository at the attestation server, the attestation server can fail to transmit a validation message to the robot (or may transmit a message to the robot indicating that the file digest is incorrect), which can cause the robot to operate with limited functionality. That is, since the file digests do not match, it can be ascertained that contents of such file have been modified in an unauthorized manner at the robot.

Additional techniques may also be utilized to protect communications between the robot and the attestation server from replay attacks. Pursuant to an example, to facilitate prevention of replay attacks, two different nonces can be utilized in communications between the robot and the attestation server. A first nonce can be generated by the robot, and a second nonce can be generated by the attestation server. As will be understood by one skilled in the art, a nonce is a randomly generated plurality of digits that have been used in cryptography to prevent replay attacks. In an example, the robot can transmit an attestation request to the attestation server, wherein the attestation request comprises a first nonce generated at the robot. The attestation server can receive this request and can store the first nonce. The attestation server may then reply to the request, wherein the reply to the request includes a second nonce that was generated at the attestation server. The robot can reply to the response, wherein the reply to the response includes a third nonce. When the communications are occurring as desired, the third nonce will be equivalent to the second nonce as generated by the attestation server. The attestation server can receive the reply from the robot and can compare the third nonce to the second nonce. If the third nonce is equivalent to the second nonce (amongst other data that desirably matches), then the attestation server, for instance, can generate a validation message, wherein the validation message includes the first nonce (generated by the robot previously). This validation message can be transmitted back to the robot which can ensure that the first nonce matches the nonce previously generated by the robot. In other words, a security protocol is in place that requires messaging back and forth from and to the attestation server. In each direction, the transmitting entity will attach the valid nonce of the receiving entity so that the message can be validated.

While the above technologies have been described in connection with a robot, it is to be understood that other computing devices can benefit from the approaches described above. For instance, automobiles are currently being configured to operate in a semi-automated fashion, and it may be desirable to ensure that content of computer executable instructions that are utilized to operate the automobile are not altered in an unauthorized manner. Other examples of exemplary computing devices that may benefit from such technology include mobile telephones, industrial automation equipment or other suitable computer-related devices.

Other aspects will be appreciated upon reading and understanding the attached figures and description.

DETAILED DESCRIPTION

Various technologies pertaining to attesting to computer-executable code executing on a computing device will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

Figure 1:
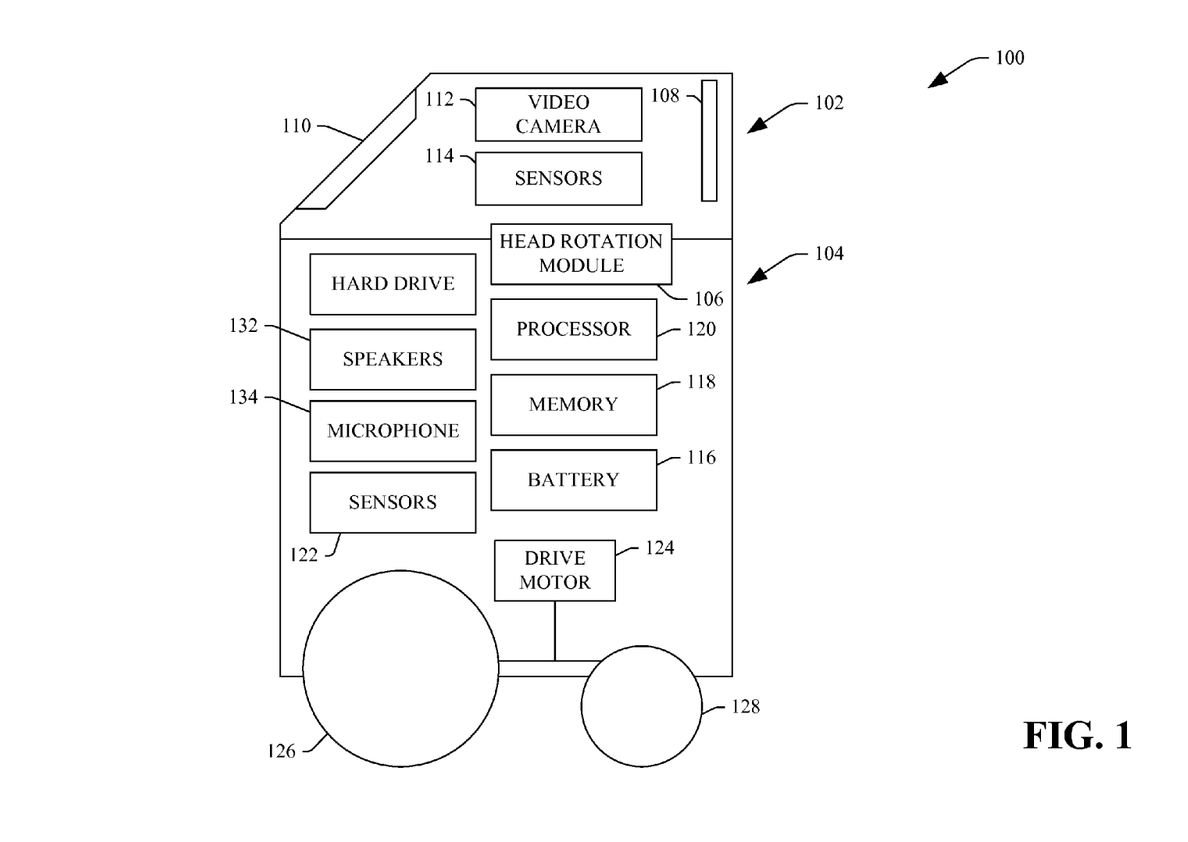
FIG. 1 illustrates an exemplary robot.

With reference to FIG. 1, an exemplary robot 100 that can communicate with a remotely located computing device by way of a network connection is illustrated. A "robot", as the term will be used herein, is an electro-mechanical machine that includes computer hardware and software that causes the robot to perform functions independently and without assistance from a user. The robot 100 comprises a head portion 102 and a body portion 104, wherein the head portion 102 is movable with respect to the body portion 104. The robot 100 can comprise a head rotation module 106 that operates to couple the head portion 102 with the body portion 104, wherein the head rotation module 106 can include one or more motors that can cause the head portion 102 to rotate with respect to the body portion 104. Pursuant to an example, the head rotation module 106 can be utilized to rotate the head portion 102 with respect to the body portion 104 up to 45° in any direction. In another example, the head rotation module 106 can allow the head portion 102 to rotate 90° in relation to the body portion 104. In still yet another example, the head rotation module 106 can facilitate rotation of the head portion 102 180° with respect to the body portion 104. The head rotation module 106 can facilitate rotation of the head portion 102 with respect to the body portion 102 in either angular direction.

The head portion 102 may comprise an antenna 108 that is configured to receive and transmit wireless signals. For instance, the antenna 108 can be configured to receive and transmit Wi-Fi signals, Bluetooth signals, infrared (IR) signals, sonar signals, radio frequency (RF), signals or other suitable signals. In yet another example, the antenna 108 can be configured to receive and transmit data to and from a cellular tower. The robot 100 can send and receive communications with a remotely located computing device through utilization of the antenna 108. As will be described in greater detail below, the robot 100 can communicate with an attestation server through utilization of the antenna 108.

The head portion 102 of the robot 100 can also comprise a display 110 is that is configured to display data to an individual that is proximate to the robot 100. For example, the display 110 can be configured to display navigational status updates to a user. In another example, the display 110 can be configured to display images that are transmitted to the robot 100 by way of the remote computer. In still yet another example, the display 110 can be utilized to display images that are captured by one or more cameras that are resident upon the robot 100.

The head portion 102 of the robot 100 may also comprise a video camera 112 that is configured to capture video of an environment of the robot. In an example, the video camera 112 can be a high definition video camera that facilitates capturing video data that is in, for instance, 720p format, 720i format, 1080p format, 1080i format, or other suitable high definition video format. Additionally or alternatively, the video camera 112 can be configured to capture relatively low resolution data in a format that is suitable for transmission to the remote computing device by way of the antenna 108. As the video camera 112 is mounted in the head portion 102 of the robot 100 through utilization of the head rotation module 106, the video camera 112 can be configured to capture live video data of a relatively large portion of an environment of the robot 100.

The robot 100 may further comprise one or more sensors 114, wherein such sensors 114 may be or include any suitable sensor type that can aid the robot 100 in performing autonomous or semi-autonomous navigation. For example, these sensors 114 may comprise a depth sensor, an infrared sensor, a camera, a cliff sensor that is configured to detect a drop-off in elevation proximate to the robot 100, a GPS sensor, an accelerometer, a gyroscope, or other suitable sensor type.

The body portion 104 of the robot 100 may comprise a battery 116 that is operable to provide power to other modules in the robot 100. The battery 116 may be, for instance, a rechargeable battery. In such a case, the robot 100 may comprise an interface that allows the robot 100 to be coupled to a power source, such that the battery 116 can be relatively easily provided with an electric charge.

The body portion 104 of the robot 100 can also comprise a memory 118 and a corresponding processor 120. As will be described in greater detail below, the memory 118 can comprise a plurality of components that are executable by the processor 120, wherein execution of such components facilitates controlling one or more modules of the robot. The processor 120 can be in communication with other modules in the robot 100 by way of any suitable interface such as, for instance, a motherboard. It is to be understood that the processor 120 is the "brains" of the robot 100, and is utilized to process data received from the remote computing device, as well as other modules in the robot 100 to cause the robot 100 to perform in a manner that is desired by a user of such robot 100.

The body portion 104 of the robot 100 can further comprise one or more sensors 122, wherein such sensors 122 can include any suitable sensor that can output data that can be utilized in connection with autonomous or semi-autonomous navigation. For example, the sensors 122 may be or include sonar sensors, location sensors, infrared sensors, a camera, a cliff sensor, and/or the like. Data that is captured by the sensors 122 and the sensors 114 can be provided to the processor 120, which can process such data and autonomously navigate the robot 100 based at least in part upon data output by the sensors 114 and 122.

The body portion 104 of the robot 100 may further comprise a drive motor 124 that is operable to drive wheels 126 and/or 128 of the robot 100. For example, the wheel 126 can be a driving wheel while the wheel 128 can be a steering wheel that can act to pivot to change the orientation of the robot 100. Additionally, each of the wheels 126 and 128 can have a steering mechanism corresponding thereto, such that the wheels 126 and 128 can contribute to the change in orientation of the robot 100. Furthermore, while the drive motor 124 is shown as driving both of the wheels 126 and 128, it is to be understood that the drive motor 124 may drive only one of the wheels 126 or 128 while another drive motor can drive the other of the wheels 126 or 128. Upon receipt of data from the sensors 114 and 122 and/or receipt of commands from the remote computing device (received by way of the antenna 108), the processor 120 can transmit signals to the head rotation module 106 and/or the drive motor 124 to control orientation of the head portion 102 with respect to the body portion 104 of the robot 100 and/or orientation and position of the robot 100.

The body portion 104 of the robot 100 can further comprise speakers 132 and a microphone 134. Data captured by way of the microphone 134 can be transmitted to the remote computing device by way of the antenna 108. Accordingly, a user at the remote computing device can receive a real-time audio/video feed and can experience the environment of the robot 100. The speakers 132 can be employed to output audio data to one or more individuals that are proximate to the robot 100. This audio information can be a multimedia file that is retained in the memory 118 of the robot 100, audio files received by the robot 100 from the remote computing device by way of the antenna 108, real-time audio data from a webcam or microphone at the remote computing device, etc.

While the robot 100 has been shown in a particular configuration and with particular modules included therein, it is to be understood that the robot can be configured in a variety of different manners, and these configurations are contemplated by the inventors and are intended to fall within the scope of the hereto-appended claims. For instance, the head rotation module 106 can be configured with a tilt motor so that the head portion 102 of the robot 100 can not only rotate with respect to the body portion 104 but can also tilt in a vertical direction. Alternatively, the robot 100 may not include two separate portions, but may include a single unified body, wherein the robot body can be turned to allow the capture of video data by way of the video camera 112. In still yet another exemplary embodiment, the robot 100 can have a unified body structure, but the video camera 112 can have a motor, such as a servomotor, associated therewith that allows the video camera 112 to alter position to obtain different views of an environment. Still further, modules that are shown to be in the body portion 104 can be placed in the head portion 102 of the robot 100, and vice versa. It is also to be understood that the robot 100 has been provided solely for the purposes of explanation and is not intended to be limiting as to the scope of the hereto-appended claims.

Figure 2:
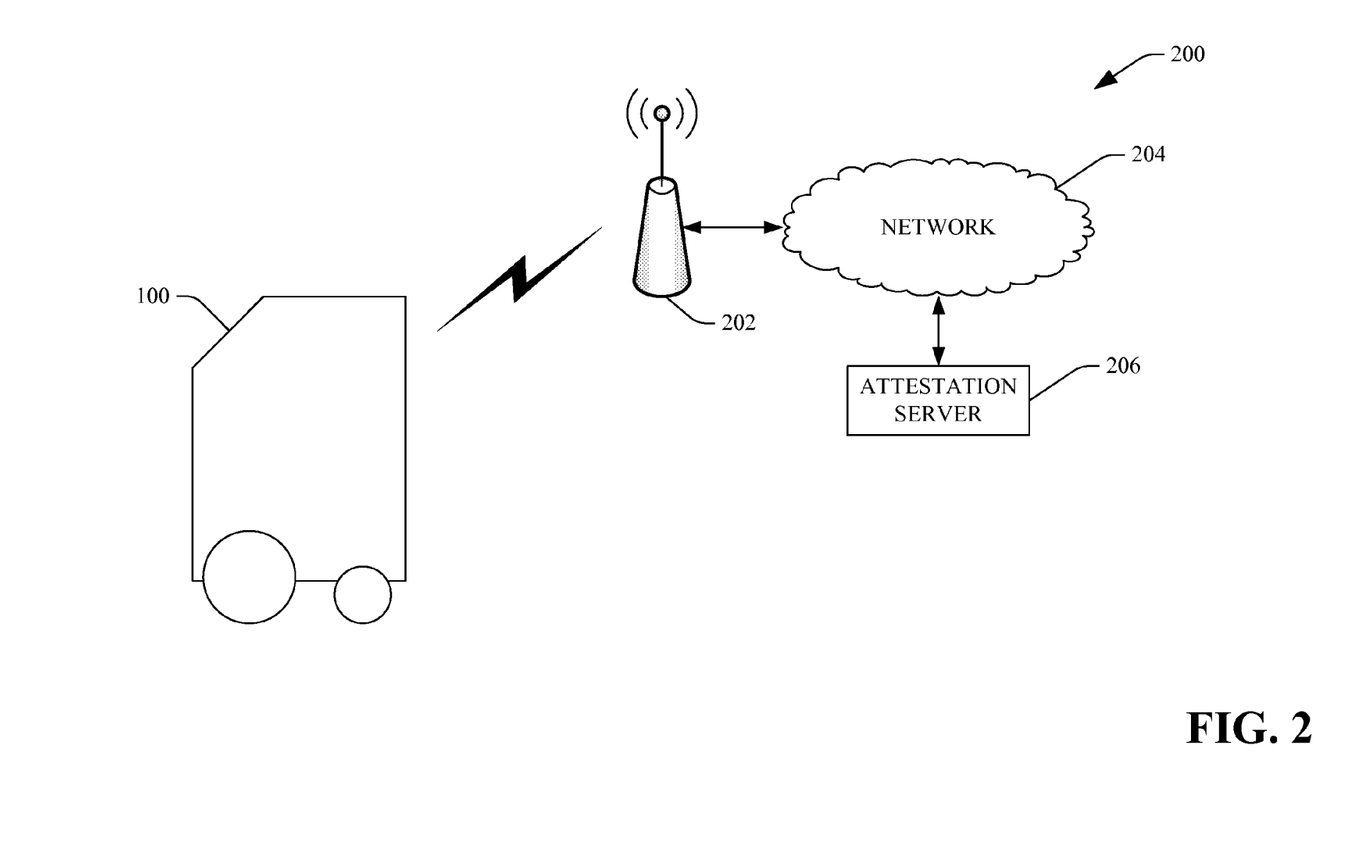
FIG. 2 illustrates an exemplary operating environment corresponding to the robot.

With reference now to FIG. 2, an exemplary environment 200 that facilitates communications between the robot 100 and an attestation server is illustrated. As described above, the robot 100 can comprise the antenna 108 that is configured to receive and transmit data wirelessly. In an exemplary embodiment, when the robot 100 is powered on, the robot 100 can communicate with a wireless access point 202 to establish its presence with such access point 202. The robot 100 may then obtain a connection to a network 204 by way of the access point 202. For instance, the network 204 may be a cellular network, the Internet, a proprietary network such as an intranet, or other suitable network.

The environment 200 further comprises an attestation server 206 that is configured to verify that contents on computer readable storage in the robot 100 have not been altered in an unauthorized manner. Such alteration may include installation of programs that are not approved by the manufacturer of the robot 100, installation of an operating system that is not desirably executed on the robot 100, existence of a computer virus on the robot 100 that causes certain files to be compromised or altered, etc. As will be described in greater detail below, the attestation server 206 can request a file digest of a randomly selected file that was known to be existent on the robot 100 at a previous point in time, wherein such file at the previous point in time is authorized by the manufacturer the robot 100. In an example, the previous point in time can be a time of manufacture of the robot 100 or a time of a software update that is approved by the manufacturer of the robot 100.

The attestation server 206 can transmit the request for the randomly selected file by way of the network 204, and such request can be delivered to the robot 100 by way of the access point 202. The request, for instance, can be in the form of a file path in a computer readable storage of the robot 100. The robot 100 can respond to this request with a file digest corresponding to the file that exists at the received file path. The file digest can be a hash of contents of the file, for example. In other words, the file digest can be a fingerprint that identifies the content of such file. The robot 100 can transmit the file digest back to the attestation server 206 by way of the access point 202 and the network 204. The attestation server 206 can compare the file digest received from the robot 100 with the file digest stored on the attestation server 206 that was known to correspond to the file at the previous point in time. If the received file digest matches the stored file digest, the attestation server 206 can transmit a validation message to the robot 100 by way of the network 204 and the access point 202. If, however, the file digest received from the robot 100 does not match the file digest retained at the attestation server 206, then the attestation server 206 can transmit a message that indicates that the content of the robot 100 has been altered in an unauthorized manner (or fail to transmit a validation message). This can cause the robot 100 to execute with limited functionality, wherein movement of the robot 100 can be limited or prohibited.

Additionally, a protocol will be described herein that facilitates prevention of replay attacks on communications between the robot 100 and the attestation server 206. This can be accomplished, for example, through utilization of multiple nonces: a first nonce generated at the robot 100 and a second nonce generated at the attestation server 206. During a loop back in the aforementioned protocol, the attestation server 206 can ensure that the robot 100 has replied with the nonce previously generated by the attestation server 206, and similarly the robot 100 can receive communication from the attestation server 206 and monitor such communications to ensure that the communications include the nonce previously generated by the robot 100. Again, this can facilitate prevention of malicious code from intercepting communications between the robot 100 and the attestation server 206 and employing replay attacks on the attestation server 206 and/or the robot 100.

While the attestation server 206 has been described above as retaining file digests corresponding to content of the robot, it is to be understood that cloud storage can retain the image of the content of the robot, and the attestation server 206 can request such image as needed. Thereafter, the attestation server 206 can compute file digests for files on the robot with, for instance, a hashing algorithm that is shared with the robot. Once validation is complete, the attestation server 206 can discard the computed file digests and/or content on the robot, and can retrieve such data from cloud storage as needed.

Figure 3:
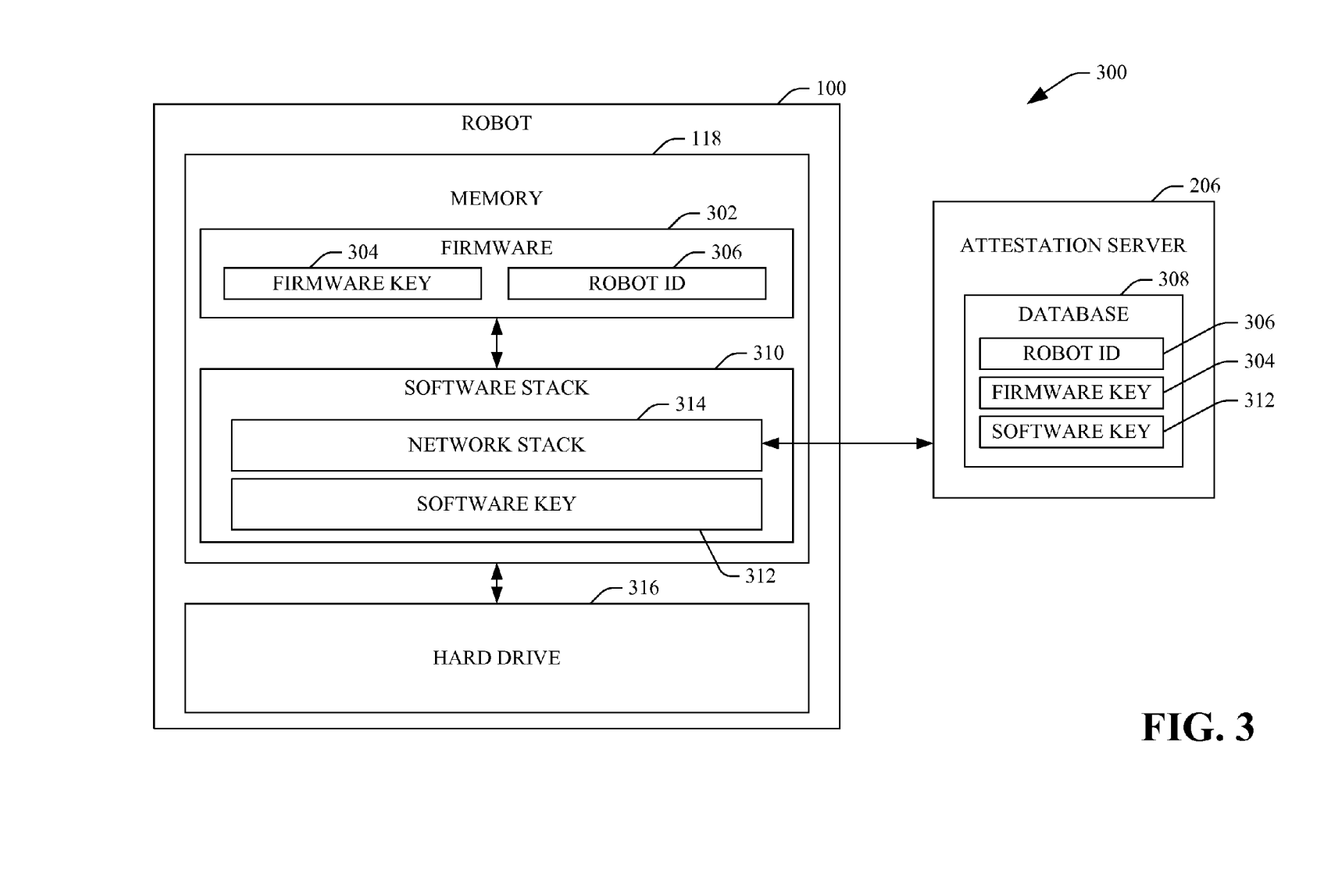
FIG. 3 is a functional block diagram of an exemplary system that facilitates attesting to contents on computer readable storage of a robot.

Now referring to FIG. 3, an exemplary system 300 that facilitates communications between the robot 100 and the attestation server 206 is illustrated. In this exemplary system 300, the robot 100 is shown to have a particular configuration with respect to computer-readable storage thereon. It is to be understood, however, that other configurations are contemplated. As mentioned previously, the robot 100 comprises the memory 118. At least a portion of such memory 118 can be dedicated as firmware 302 at a time of manufacture of the robot 100. The firmware 302 in the memory can be a portion of the memory 118 that includes read-only instructions, such that content of the firmware 302 is unalterable by users of the robot 100. At a time of manufacture the robot 100, a firmware key 304 can be established and retained in the firmware 302, wherein the firmware key 304 is a cryptographic key (or a derivative of the cryptographic key) that can be utilized to by the firmware 302 to encrypt messages generated by the firmware 302. Furthermore, the firmware 302 can comprise a robot identity 306 that uniquely identifies the robot 100 amongst other robots.

The memory 118 of the robot 100 may further comprise a software stack 310. It is to be understood that the software stack 310 is unable to read or modify the firmware key 304; rather, a highly secure portion of code in the firmware 302 is solely able to access the firmware key 304. The software stack 310 comprises a plurality of computer executable instructions that facilitate causing the robot 100 to operate in a desired manner when such instructions are executed by the processor 120. For instance, portions of the software stack 310 can cause the robot to operate in an autonomous manner. In another example, portions of the software stack 310 can cause the robot to operate in accordance with commands received from a user. It is thus to be understood that computer executable code in the software stack 310 can be utilized to process data received from the sensors 114 and 122, video from the video camera 112, and can control the modules described above with respect to FIG. 1 based at least in part upon such data.

The software stack 310 can include a software key 312, wherein the software key 312 is a cryptographic key that can be utilized to encrypt messages generated at the software stack 310. The software key 312 can be included in the software stack 310 at the time of manufacture of the robot 100.

The software stack 310 may further comprise a network stack 314, wherein the network stack 314 comprises computer executable code that facilitates transmitting and receiving data to and from the attestation server 206. As will be understood, the network stack 314 can comprise a set of protocols that are utilized in a communications network to transmit and receive data. In this exemplary embodiment, the firmware 302 does not include a network stack. Thus, any messages generated at the firmware 302 that are desirably transmitted to the attestation server 206 will pass through the software stack 310 (e.g., through the network stack 314). In other embodiments, however, the firmware 302 may include its own network stack.

The robot 100 may further comprise a hard drive 316. In an example, content of the hard drive 316 can be retained in cloud storage and/or at the attestation server 206, including user data. For the purposes of illustration, the software stack 310 has been shown to be entirely residing in the memory 118. It is to be understood, however, that at least a portion of the software stack 310 can be placed on the hard drive 316 and loaded into the memory 118 as needed. Accordingly, at time of manufacture of the robot 100 and/or a time when the software stack 310 is updated in an authorized manner, the hard drive 316 may include portions of the software stack 310. Therefore, it is desirable to prevent an individual from removing the hard drive 316 and replacing such hard drive 316 with another hard drive loaded with different software (e.g., a different operating system).

The attestation server 206, as described above, is in communication with the robot 100 by way of a network, and can further be in communication with the manufacturing plant that manufactures the robot 100. The attestation server 206 can comprise a database 308, wherein the database 308 can include the firmware key 304, the robot identity 306, and the software key 312, which are also included in the firmware 302 and the software stack 310, respectively. The firmware key 304, the robot identity 306, and the software key 312 can be provided to the attestation server 206 by the manufacturing plant at the time of manufacture of the robot 100.

While the database 308 is shown as including the firmware key 304, the robot identity 306, and the software key 312, it is to be understood that the database 308 can include a significant amount of additional information pertaining to contents of the software stack 310. For example, at time of manufacture of the robot 100, the manufacturing plant can provide the attestation server 206 with an image of content of the robot 100. Thus, the database 308 in the attestation server 206 can additionally comprise a plurality of file paths that correspond to file paths in the software stack 310. The database 308 can further comprise file digests corresponding to the files at the file paths, wherein the file digests are indicative of content of the files in the software stack 310. For instance, a file digest may be a hash of contents of a file. File digests retained in the database 308 can be computed at the attestation server 206 or can be precomputed at the manufacturing plant and provided to the attestation server 206.

Again, while the robot 100 has been described as including the memory 118 that comprises the firmware 302 and the software 310, it is to be understood that in another exemplary embodiment the memory 118 may include no firmware. In another exemplary embodiment, the robot 100 may not include a "hard drive", but may instead include extensions to the memory 118 such as flash memory or other suitable memory.

With reference now to FIGS. 4-8, various exemplary methodologies/control flows are illustrated and described. While the methodologies and control flow are described as being a series of acts that are performed in a sequence, it is to be understood that the methodologies and control flow are not limited by the order of the sequence. For instance, some acts may occur in a different order than what is described herein. In addition, an act may occur concurrently with another act. Furthermore, in some instances, not all acts may be required to implement a methodology or control flow described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies and control flow may be stored in a computer-readable medium, displayed on a display device, and/or the like. The computer-readable medium may be a non-transitory medium, such as memory, hard drive, CD, DVD, flash drive, or the like.

Figure 4:
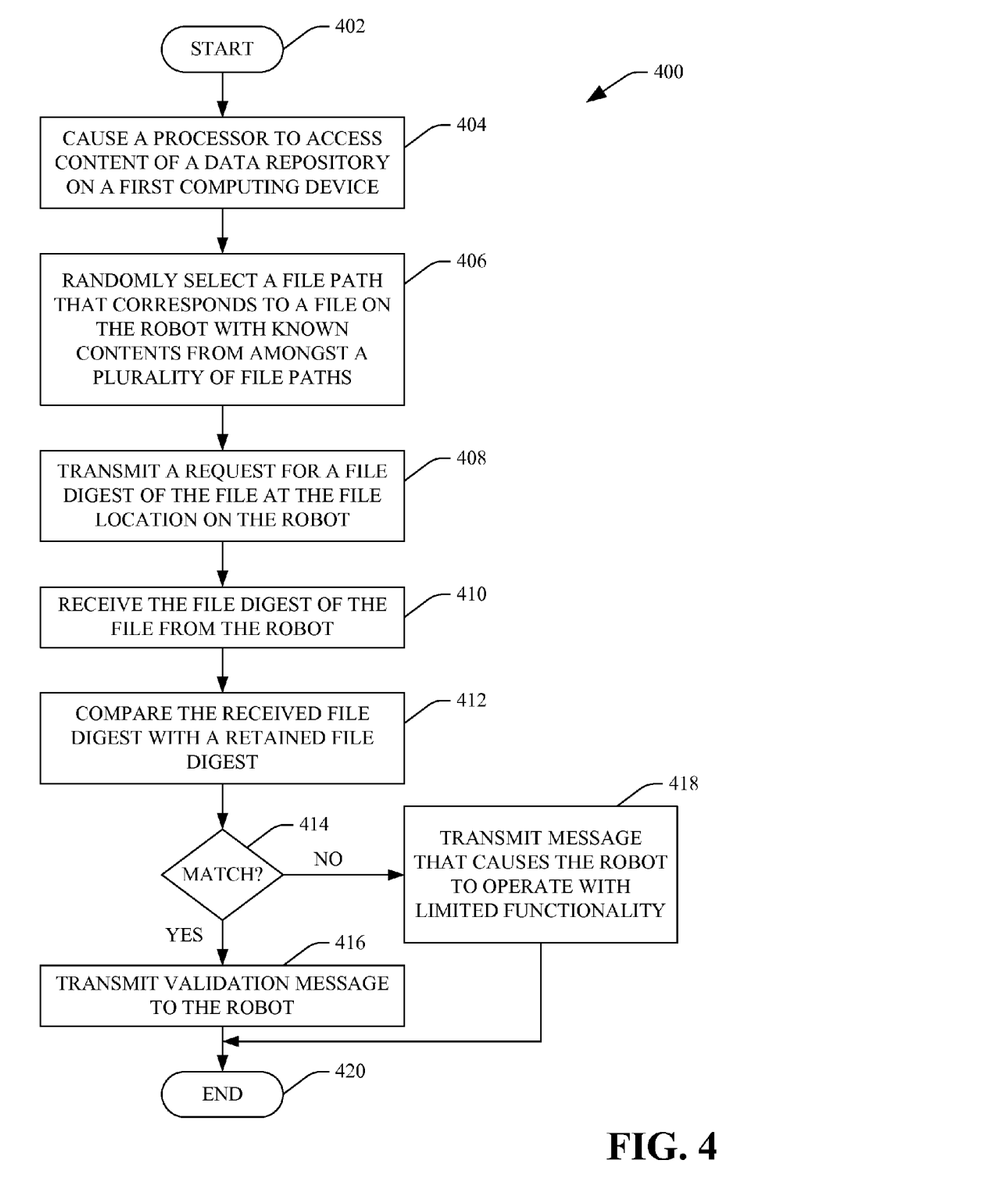
FIG. 4 is a flow diagram that illustrates an exemplary methodology for ensuring that contents of computer readable storage on a robot have not been altered in an unauthorized manner.

With reference now to FIG. 4, an exemplary methodology 400 that can be executed by the attestation server 206 in connection with verifying that contents of computer readable storage on the robot 100 have not been altered in an unauthorized manner is illustrated. The methodology 400 starts at 402, and at 404 a processor is caused to access content of a data repository on a first computing device. Here, the first computing device may be the attestation server, for example. The content of the data repository can include a plurality of file paths corresponding to a plurality of files existent on the robot 100 at a time of manufacture the robot 100, and/or at a previous point in time when an authorized update to software on the robot 100 has occurred. The data repository can further include data that is indicative of content of each of the plurality of files (e.g., file digests corresponding to the files on the robot 100). Accordingly, the data repository can include the plurality of file paths as well as data indicative of content of files at each of the file paths on the robot 100 at a previous point in time, wherein such content has been authorized by the manufacturer of the robot 100.

Pursuant to an example, the processor can access content of the data repository responsive to receipt of an attestation request from the robot 100. In another example, the processor can access content of the data repository responsive to passage of a particular threshold amount of time. In still yet another example, the processor can be caused to access content of a data repository in random time intervals.

At 406, a file path is randomly selected from amongst the plurality of file paths, wherein the selected file path corresponds to a file on the robot with known contents at a previous point in time.

At 408, a request is transmitted to the robot, wherein the request is a request for a file digest of the file on the robot 100 at the randomly selected file path. Thereafter, the robot 100 can access the memory 118 or the hard drive 316 to retrieve the file at the randomly selected file path. The robot 100 may then calculate a file digest for that file on the robot 100, wherein the file digest is indicative of contents of the file. At 410, the file digest of the file at the randomly selected file path is received from the robot 100.

At 412, the received file digest is compared with the file digest retained in a data repository at the first computing device (at the attestation server 206). If the file digests do not match, it can be ascertained that content of computer readable media on the robot 100 has been altered in an unauthorized manner. At 414, a determination is made regarding whether the file digest received from the robot 100 matches the file digest retained in the data repository. If the file digests match, then at 416 a validation message is transmitted to the robot 100. This validation message can allow the robot 100 to continue operating with full functionality. If at 414 it is determined that be file digest received from the robot 100 does not match the file digest retained in the data repository, then at 418 a message can be transmitted from the first computing device to the robot 100 that causes the robot to operate with limited functionality. For instance, movement of the robot 100 can be restricted if it is determined that the received file digest does not match the file digest retained at the data repository. Pursuant to an example, either the message transmitted at 416 or the message transmitted at 418 can be received at the firmware 302 in the memory 118 of the robot 100, and the firmware 302 can be configured with instructions that causes the robot 100 to operate with full functionality or with limited functionality depending on the type of message received from the attestation server 206. The methodology 400 completes at 420.

Figure 5:
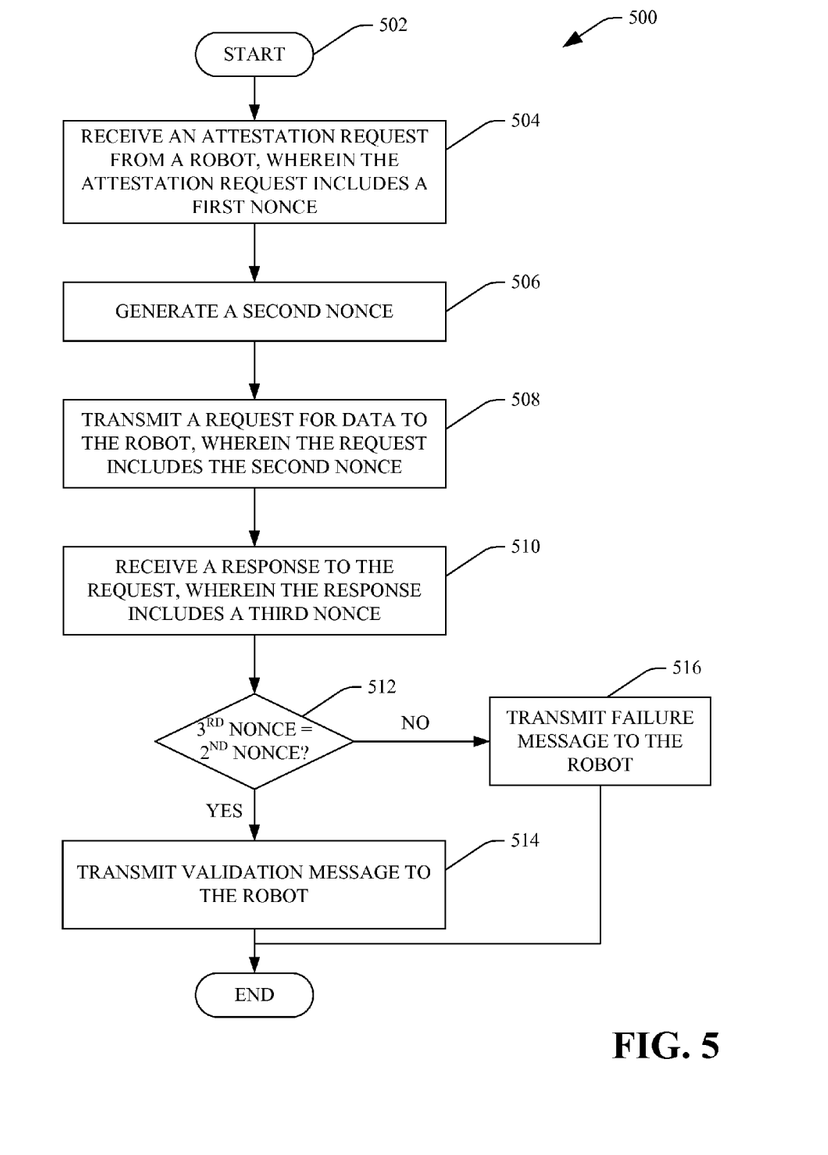
FIG. 5 is a flow diagram that illustrates an exemplary methodology for utilizing several nonces to prevent replay attacks.

Now referring to FIG. 5, an exemplary methodology 500 that facilitates prevention of replay attacks on communications between a first computing device and a second computing device is illustrated. Pursuant to an example, the methodology 500 can be configured for execution on the attestation server 206. The methodology 500 starts at 502, and at 504, an attestation request is received from a robot, wherein the attestation request includes a first nonce. A nonce is a random or pseudorandom number that is issued in an authentication protocol. In an example, the first nonce can have a timestamp that is a portion thereof or associated therewith.

At 506, subsequent to receiving the attestation request from the robot, a second nonce is generated, wherein the second nonce is different from the first nonce. Furthermore, the first nonce can be retained in a computer readable medium.

At 508, a request for data is transmitted to the robot, wherein the request for data includes the second nonce. As described previously, the request for data may be a request for a file digest of a file at a randomly selected location on the robot.

At 510, a response to the request for data is received, wherein the response includes a third nonce. It is desirable that the third nonce is equivalent to the second nonce generated at 506 and transmitted to the robot at 508.

At 512, a determination is made regarding whether the third nonce is equivalent to the second nonce (whether the robot included the second nonce in the reply to the request). If the third nonce is found to be equivalent to the second nonce, then at 514 a validation message is transmitted to the robot. If, however, at 512 it is determined that the third nonce is not equivalent to the second nonce, then at 516 a failure message is transmitted to the robot 100. This failure message can indicate that a replay attack has been attempted and can cause the robot 100 to operate with limited functionality. The methodology 500 completes at 518.

Figure 6:
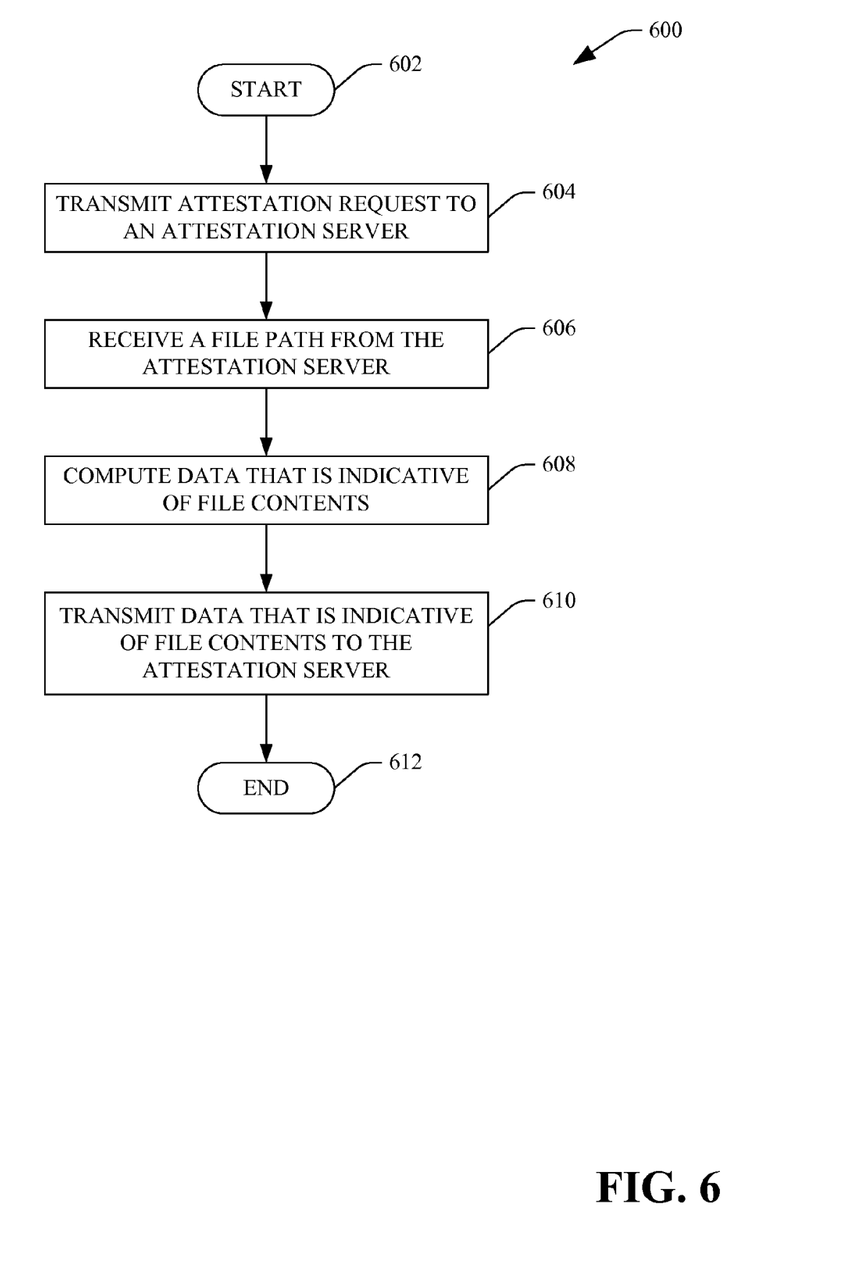
FIG. 6 is a flow diagram that illustrates an exemplary methodology that facilitates ensuring that contents of computer readable storage on a computing device have not been altered in an unauthorized manner.

Now turning to FIG. 6, an exemplary methodology 600 that facilitates receiving an attestation that contents of the computer readable storage on the robot 100 have not been altered in an unauthorized manner is illustrated. The methodology 600, for instance, may be configured for execution on the robot 100. The methodology 600 starts at 602, and at 604 an attestation request is transmitted to an attestation server. For example, the firmware 302 in the robot 100 may include instructions to request an attestation at time of boot up of the robot 100 and periodically thereafter. Accordingly, the firmware 302 can be configured to initiate transmission of an attestation request to the attestation server.

At 606, a file path is received from the attestation server, wherein the file path points to a particular file in computer readable storage on the robot 100. As described previously, this file path can be randomly selected by the attestation server 206 from amongst a plurality of file paths.

At 608, data that is indicative of file contents in the file that corresponds to the received file path is computed (e.g., a file digest is computed). At 610, the file digest is transmitted to the attestation server 206. There, the attestation server 206 can determine if the file digest matches a known file digest corresponding to such file. Subsequently, the robot can receive a validation message or a failure message. The methodology 600 completes at 612.

Figure 7:
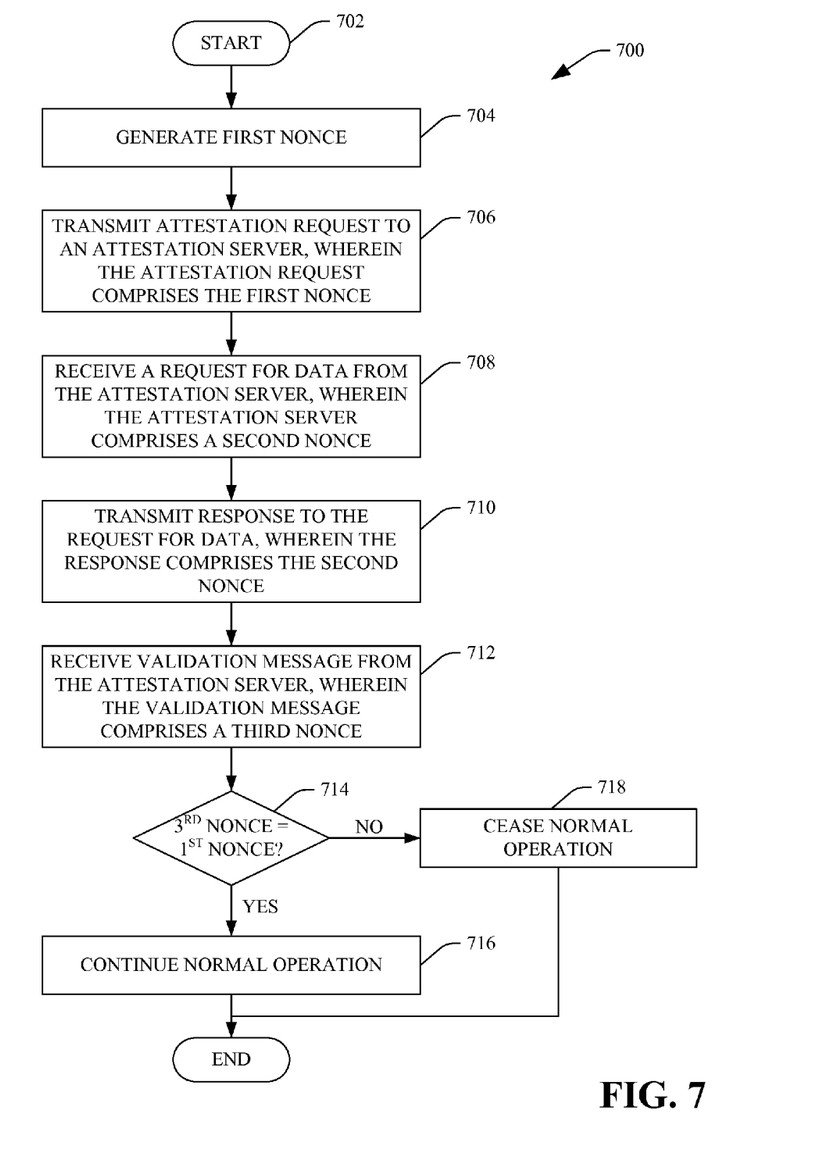
FIG. 7 is a flow diagram that illustrates an exemplary methodology that facilitates prevention of replay attacks.

Now referring to FIG. 7, an exemplary methodology 700 that facilitates prevention of replay attacks between the robot 100 and the attestation server 206 is illustrated. For example, the methodology 700 can be configured for execution on the robot 100. The methodology 700 starts at 702, and at 704 a first nonce is generated. At 706, an attestation request is transmitted to an attestation server, wherein the attestation request comprises the first nonce. For instance, the attestation request can be generated by the firmware 302 in the memory 118 of the robot 100.

At 708, subsequent to transmitting the attestation request, a request for data is received from the attestation server, wherein the request for data comprises a second nonce. The second nonce can be generated at the attestation server and may be different from the first nonce.

At 710, responsive to receipt of the request for data from the attestation server, response data can be transmitted to the attestation server, wherein the response data comprises the second nonce. Thus, the robot 100 can reply to the attestation server 206 with the nonce that was previously generated by the attestation server.

At 712, a validation message is received from the attestation server, wherein the validation message comprises a third nonce. It is desirable that the nonce received in the validation message at 712 be equivalent to the first nonce generated at 704.

At 714, a determination is made regarding whether the third nonce received at 712 is equivalent to the first nonce generated at 704. If it is determined that the third nonce is equivalent to the first nonce, then at 716 normal operation of the robot is continued. If, however, the third nonce is not equivalent to the first nonce (that is, the attestation server with a validation message comprises a nonce that was not generated by the robot 704), then at 718 normal operation of the robot is ceased. The methodology 700 completes at 720.

Figure 8:
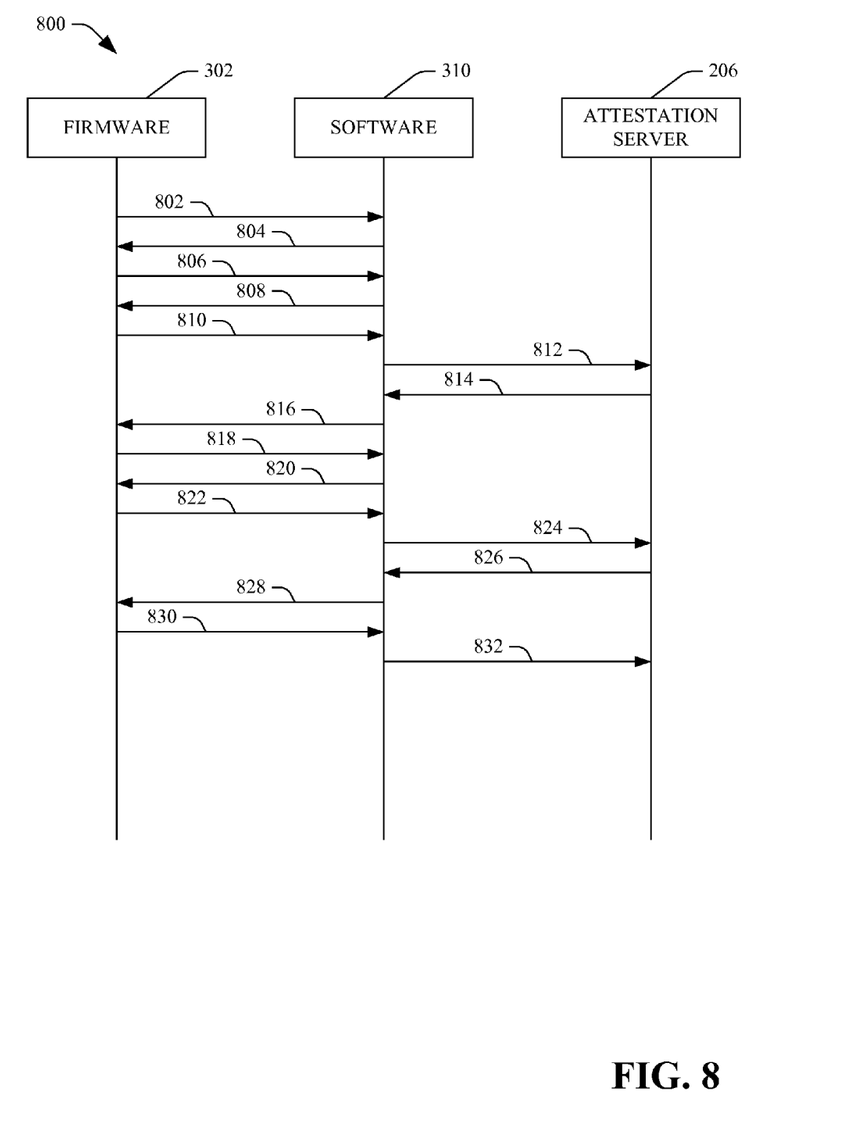
FIG. 8 is a control flow diagram that illustrates communications between software executing on a robotic device, computer executable instructions executing on firmware on a robotic device, and an attestation server.

With reference now to FIG. 8, an exemplary control flow diagram 800 that illustrates attestation of contents of the software stack 310 on the robot 100 is illustrated. The exemplary control flow diagram 800 corresponds with the architecture of the robot 100 described in connection with FIG. 3, wherein the memory 118 of the robot 100 comprises the firmware 302 and the software stack 310, and wherein the software stack 310 comprises the network stack 314, such that communication to the attestation server 206 is through the software stack 310. As mentioned previously, during manufacture of the robot 100, certain information is shared between the firmware 302 and the attestation server 206 and the software stack 310 and the attestation server 206. Specifically, the firmware 302 includes the firmware key 304 and the robot identity 306, and the attestation server 206 also includes the firmware key 304 and the robot identity 306. Moreover, the software stack 310 includes the software key 312, which is also included in the attestation server 206.

Furthermore, the attestation server 206 can comprise an image of contents of the software stack 310, wherein said image can be updated, for instance, each time an authorized update is made to the software stack 310. Additionally or alternatively, the attestation server 206 can comprise a plurality of file digests corresponding to the plurality of files in the software stack 310, and can also comprise file paths to such files. This information can be indexed on the attestation server 206, for example, by the robot identity 306.

At 802, computer executable instructions resident on the firmware 302 generate an attestation request. For example, computer executable instructions on the firmware 302 can be configured to cause the robot 100 to operate with limited functionality if the software stack 310 is not attested to by the attestation server 206 at boot up time or within specific amounts of time. The software stack 310 (which can comprise operating system of the robot 100) receives the attestation request from the firmware 302, and determines whether a cached response is sufficient to satisfy the attestation request. For example, if the attestation server 206 has recently attested to contents of the software stack 310, then at 804 the software stack 310 can respond to the attestation request with a cached response. Such cached response may be a validation message that was previously transmitted to the software stack 310 by the attestation server 206. The firmware 302 can analyze the cached response to determine if such cached response is valid (if it has a time stamp corresponding to a relatively recent point in time). If the cached response is invalid, or at boot up of the robot 100, the firmware 302 can generate a full attestation cycle request. In other words, at 806 the firmware 302 can inform the software stack 310 that an updated validation message is desirably received from the attestation server 206.

At 808, the software stack 310 transmits a request to the firmware 302 to generate a first nonce. Responsive to receiving such request, the firmware 302 can generate the first nonce. Optionally, the firmware 302 can append a timestamp to the first nonce and can further add a data packet that acts as a sentinel to the first nonce. Furthermore, the firmware 302 can encrypt the resulting data packet (the nonce, the timestamp and the sentinel) with the firmware key 304. The combination of the nonce, the timestamp and the sentinel can be collectively referred to as the first nonce, and the firmware 302 can utilize the firmware key 304 to encrypt the first nonce.

At 810, the firmware 302 can transmit the encrypted first nonce to the software stack 310.

The software stack 310 may then further encrypt the first nonce through utilization of the software key 312. Moreover, optionally, the software stack 310 can add the robot identity 306 to the data packet and further encrypt such data packet with a public key that corresponds to the attestation server 206.

At 812, this data packet is transmitted to the attestation server 206. Upon receipt thereof, the attestation server decrypts the data packet using, for instance, a private key of the attestation server 206, the firmware key, and the software key. The attestation server 206 may then retain the first nonce generated by the firmware 302 in data storage. The data transmitted to the attestation server 206 at 812 can be referred to as an attestation request received at the attestation server 206. Responsive to such request, the attestation server 206 can generate a second nonce and can further randomly select a file path that corresponds to a file on the robot 100. As mentioned previously, the attestation server 206 comprises a database with a number of file paths and corresponding file digests. The attestation server 206 can randomly select a file path for transmission to the robot 100 to verify that contents of the software stack 310 have not been altered in an unauthorized manner. The attestation server 206 can further encrypt this nonce and the full file path utilizing the software key 312 and the firmware key 304 (and optionally a private key on the attestation server 206 that corresponds to a public key). At 814, the attestation server 206 can transmit the encrypted second nonce and full file path to the software stack 310. The software stack 310 may then decrypt the data through utilization of the software key 312. At 816, the software stack 310 transmits the partially decrypted nonce and full file path to the firmware 302, which can further decrypt the data packet utilizing the firmware key 304. The firmware 302 can cause the second nonce to be retained in computer readable storage at the robot 100.

At 818, the firmware 302 causes the full file path to be transmitted to the software stack 310. The software stack 310 accesses the file that corresponds to the full file path and generates a file digest for such file. At 820, the software stack 310 transmits the file digest corresponding to the full file path to the firmware 302. The firmware 302, responsive to receipt of the file digest, can generate a cryptographic challenge. Such cryptographic challenge, for instance, can include an encryption of the file digest, the robot identity 306, a particular challenge command, a timestamp, and the second nonce generated by the attestation server 206. Moreover, the firmware 302 can encrypt the challenge utilizing the firmware key 304. The encrypted challenge can be transmitted to the software stack 310 at 822. The software stack 310 may then further encrypt the challenge utilizing the software key 312. Additionally, the software stack 310 can add the robot identity 306 to the challenge and further encrypt the data utilizing the public key of the attestation server 206.

The software stack 310 then transmits this encrypted challenge to the attestation server 206 at 824. Thereafter, the attestation server 206 decrypts the challenge utilizing the private key of the attestation server 206, the software key 312 and the firmware key 304. The attestation server 206 can utilize the robot identity 306 included in the challenge to locate the appropriate file digest in the database. The attestation server 206 can compare the timestamp included in the received challenge with a current time to ensure that the challenge has been transmitted within a threshold amount of time. The attestation server 206 can further check the nonce included in the challenge to ensure that the nonce matches the nonce that was previously transmitted by the attestation server 206. Moreover, the attestation server 206 compares the file digest received in the challenge with the file digest retained in the database at the attestation server 206. If the attestation server 206 determines that the attestation challenge was transmitted within a threshold amount of time, that the nonce included in the challenge matches the second nonce generated by the attestation server 206, and that the file digest matches the file digest in the database, then the attestation server 206 can generate a validation message for transmittal to the software stack 310. The attestation server 206 can encrypt this validation message, for example, with the software key and the firmware key. Additionally, the attestation server 206 can include the first nonce (generated by the firmware 302) in the validation response. The attestation server 206 may transmit the validation response to the software stack 310 at 826.

The software stack 310 may then decrypt the validation response utilizing the software key 312 and can transmit the remainder of the data to the firmware 302 at 828. The firmware 302 can analyze a timestamp corresponding to the validation message to ensure that the validation response has been received within a threshold amount of time from the challenge request and can compare the nonce in the validation request with the nonce previously generated by the firmware 302. If the nonces match, and the message includes a validation message, and a timestamp in the validation message is within the threshold amount of time, then at 830 the firmware 302 can transmit a message to the software stack 310 indicating that attestation has completed. At 832, the software stack 310 can transmit a message to the attestation server 206 indicating that the attestation has completed and the transaction is closed. If the firmware 302 determines that the nonce in the validation message does not match the previously generated nonce, or ascertains that the message indicates that attestation has failed, then the firmware 302 can effectively cause the robot 100 to operate with limited functionality.

While the systems, methods and control flow diagram described above have been described with respect to robots, it is to be understood that various other devices that include computing technology can utilize aspects described herein. For instance, industrial automation equipment includes various moving parts, and may be controlled at least in part through utilization of software. One or more of the methods described herein pertaining to ensuring that the software utilized to control this industrial automation machinery is valid can be employed. Still further, automobiles are being configured to perform some automated driving tasks, such as parallel parking. Again, this can be controlled by software executing on a computing device included in the automobile. The methods described herein can be utilized in connection with ensuring that the software executing on the automobile is valid to ensure that the automobile will operate as expected or desired by the manufacturer and operator. Still further, the systems and methods utilized herein may be employed in conventional computing devices such as desktop computers, gaming consoles, laptop computers, mobile telephones, mobile media players, DVD players, amongst other computing devices.

Figure 9:
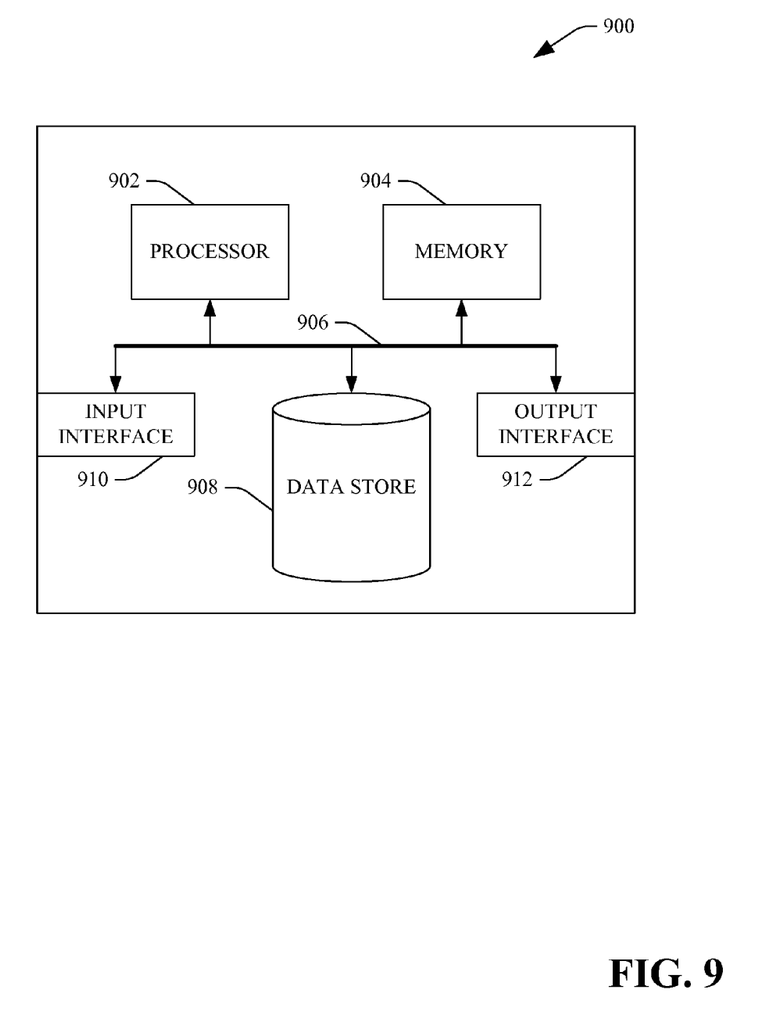
FIG. 9 is an exemplary computing system.

Now referring to FIG. 9, a high-level illustration of an exemplary computing device 900 that can be used in accordance with the systems and methodologies disclosed herein is illustrated. For instance, the computing device 900 may included in the attestation server 206 or the robot 100. In any event, the computing device 900 can be used in a system that supports attesting to computer-executable code on a robot. The computing device 900 includes at least one processor 902 that executes instructions that are stored in a memory 904. The memory 904 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store cryptographic keys, nonces, file digests, etc.

The computing device 900 additionally includes a data store 908 that is accessible by the processor 902 by way of the system bus 906. The data store 908 may be or include any suitable computer-readable storage, including a hard disk, memory, etc. The data store 908 may include executable instructions, cryptographic keys, nonces, file digests, file paths, etc. The computing device 900 also includes an input interface 910 that allows external devices to communicate with the computing device 900. For instance, the input interface 910 may be used to receive instructions from an external computer device, a user, etc. The computing device 900 also includes an output interface 912 that interfaces the computing device 900 with one or more external devices. For example, the computing device 900 may display text, images, etc. by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices. Furthermore, a component or system may refer to a portion of memory and/or a series of transistors.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method executed by a server computing device that is in communication with a robot, the method comprising:
   accessing content of a data repository on the server computing device, wherein the content of the data repository comprises, for files known to exist on the robot at a prior point in time:
   respective locations of the files on the robot at the prior point in time; and
   data that is indicative of respective contents of the files on the robot at the prior point in time-of;
   randomly selecting one location from amongst the locations,
   transmitting a request to the robot for data indicative of current content of a file on the robot at the one location;
   subsequent to the transmitting of the request, receiving from the robot the data that is indicative of the current content of the file on the robot that is at the one location;
   comparing the data that is indicative of the content of the file in the data repository with the data that is indicative of the current content of the file received from the robot; and
   transmitting an instruction to the robot when the data that is indicative of the content of the file in the data repository is different from the data that is indicative of the current content of the file received from the robot, wherein the instruction is configured to restrict mobility of the robot.

2. The method of claim 1, wherein the server computing device is in communication with the robot by way of a network.

3. The method of claim 1, wherein the network is the Internet.

4. The method of claim 1, further comprising:
   prior to accessing the content of the data repository on the server computing device, receiving a request, at the server computing device from the robot, for a randomly selected file location, wherein the request is encrypted through utilization of a first encryption key; decrypting the request;
   subsequent to decrypting the request, generating a first nonce, wherein the first nonce comprises a plurality of random digits; and
   transmitting to the robot the first nonce together with the request for data indicative of content of the file at the one location.

5. The method of claim 4, wherein the request from the robot for the randomly selected file comprises a second nonce, wherein the second nonce is generated at the robot, and further comprising:
   storing the second nonce in the data repository.

6. The method of claim 5, wherein the data that is indicative of the current content of the file on the robot is included in a data packet, wherein the data packet comprises a third nonce, and the method further comprising:
   comparing the third nonce with the first nonce; and causing the instruction to be transmitted to the robot based at least in part upon the comparing of the third nonce with the first nonce, wherein the instruction is transmitted to the robot when the third nonce is different from the first nonce.

7. The method of claim 1, further comprising:
   transmitting a first timestamp together with the request for data indicative of current content of the file at the one location to the robot, wherein the first timestamp identifies a time that the request for data indicative of the current content of the file at the one location is transmitted to the robot;
   receiving a second timestamp from the robot together with the data that is indicative of the current content of the file on the robot that is at the one location, wherein the second timestamp identifies a time that the robot transmits the data that is indicative of the current content of the file on the robot;
   computing a difference between the first timestamp and the second timestamp; comparing the difference with a predefined threshold; and
   when the difference is greater than the predefined threshold, transmitting the instruction to the robot.

8. An attestation server that comprises a processor and a memory, the memory comprising instructions that, when executed by the processor cause the processor to perform acts comprising:
   receiving a request from a robot for a randomly selected file location;
   responsive to receiving the request, randomly selecting a file location that points to a file on the robot, wherein content of the file on the robot at a previous point in time is known;

transmitting the file location, by way of a network, to the robot;

subsequent to transmitting the file location, receiving, from the robot, data that is indicative of current content of the file on the robot;

comparing the data that is indicative of the current content of the file on the robot with the known content of the file on the robot at the previous point in time;

when the data that is indicative of the current content of the file on the robot is different from the data that is indicative of the content of the file on the robot at the previous point in time, transmitting a data packet to the robot that causes mobility of the robot to be restricted.

9. The attestation server of claim 8, wherein the previous point in time is a time corresponding to manufacture of the robot.

10. The attestation server of claim 8 being configured to attest to validity of at least one computer-executable program residing on the robot.

11. The attestation server of claim 8, the acts further comprising:

prior to randomly selecting the file location, receiving a first nonce from the robot together with the request;

responsive to receiving the request from the robot, generating a second nonce; and transmitting, to the robot, the second nonce together with the file location.

12. The attestation server of claim 8, the acts further comprising:

prior to transmitting the file location to the robot, encrypting the file location through utilization of a first key to generate a first encrypted file location; and encrypting the first encrypted file location through utilization of a second key to generate a second encrypted file location, wherein the file location transmitted to the mobile robot is the second encrypted file location.

13. The attestation server of claim 8, wherein data that is indicative of the current content of the file is encrypted by the robot through utilization of a first key and a second key, the acts further comprising:

decrypting the data that is indicative of the current content of the file through utilization of the first key; and further decrypting the data that is indicative of the current content of the file through utilization of the second key.

14. The attestation server of claim 8, the acts further comprising:

receiving from the robot data that identifies the robot; and accessing file locations that correspond to the robot based upon the data that identifies the robot.

15. A method configured for execution on an attestation server, the method comprising:

receiving a first data packet from a robot by way of a network, wherein the first data packet comprises:

an identity of the robot;

a request to attest to contents of a data repository included in the robot; and a first nonce generated at the robot, wherein the first nonce comprises a first plurality of randomly generated digits;

responsive to receiving the first data packet, accessing a database utilizing the identity of the robot as an index key to the database, wherein the database comprises file locations corresponding to a plurality of files known to be existent on the robot at a time of manufacture of the robot, wherein the database further comprises file digests corresponding to the plurality of files known to be existent on the robot at the time of manufacture of the robot;

randomly selecting a file location from the file locations in the database that corresponds to the identity of the robot;

generating a second nonce, wherein the second nonce comprises a second plurality of randomly generated digits;

storing the second nonce in a computer-readable medium;

transmitting a second data packet to the robot, wherein the second data packet comprises the file location and the second nonce;

subsequent to transmitting the second data packet to the robot, receiving a third data packet from the robot, wherein the third data packet comprises data that is indicative of content of a file on the robot at the file location and a third nonce;

comparing the second nonce with the third nonce;

comparing a file digest in the database that corresponds to the file location transmitted to the robot with the data that is indicative of content of the file on the robot at the file location;

if the second nonce and the third nonce are equivalent and if the file digest corresponds to the data that is indicative of the content of the file on the robot at the file location, transmitting a validation message to the robot that attests to contents of the data repository in the robot; and if the second nonce and the third nonce are different or if the file digest fails to correspond to the data that is indicative of the content of the file on the robot at the file location, transmitting a message to the robot that indicates that attestation has failed.

16. The method of claim 1, further comprising:

transmitting a second instruction to the robot when the data that is indicative of the content of the file in the data repository is equivalent to the data that is indicative of the current content of the file received from the robot, the second instruction configured to enable mobility of the robot.

17. The attestation server of claim 8, the acts further comprising:

when the data that is indicative of the current content of the file on the robot is equivalent to the data that is indicative of the content of the file on the robot at the previous point in time, transmitting a second data packet to the robot that causes mobility of the robot to be unrestricted.

18. The attestation server of claim 8, the previous point in time corresponding to when an authorized update to an operating system of the robot was installed on the robot.

19. The attestation server of claim 8, the acts further comprising:

updating the data that is indicative of the content of the file on the robot at the previous point in time responsive to receiving an indication that an authorized update to the file has been made on the robot.

20. The attestation server of claim 8, the acts further comprising:

comparing a time identified in a first timestamp with a current time, the first timestamp assigned to the data that is indicative of the current content of the file on the robot, as received from the robot; and when a difference between the time identified in the first timestamp and the current time is above a threshold, transmitting the data packet to the robot that causes mobility of the robot to be restricted.

* * * * *